United States Patent (10) Patent No.: US 8,642,001 B2
Herbiet et al. (45) Date of Patent: *Feb. 4, 2014

(54) ALUMINUM HYDROXIDE

(75) Inventors: Rene Gabriel Erich Herbiet, Eupen (BE); Norbert Wilhelm Puetz, Niederaussem (DE); Volker Ernst Willi Keller, Frechen (DE); Winfried Toedt, Steffln-Auel (DE)

(73) Assignee: Albemarle Corporation, Baton Rouge, LA (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/304,507

(22) PCT Filed: Jun. 21, 2007

(86) PCT No.: PCT/IB2007/004663
§ 371 (c)(1),
(2), (4) Date: Dec. 12, 2008

(87) PCT Pub. No.: WO2009/001169
PCT Pub. Date: Dec. 31, 2008

(65) Prior Publication Data
US 2010/0160541 A1 Jun. 24, 2010

(51) Int. Cl.
*C01F 7/18* (2006.01)
(52) U.S. Cl.
USPC ............ 423/629; 524/437; 524/444; 524/586
(58) Field of Classification Search
USPC .................................. 524/437, 444; 423/629
See application file for complete search history.

(56) References Cited

U.S. PATENT DOCUMENTS

| 3,268,295 | A | | 8/1966 | Armbrust, Jr. et al. | |
|---|---|---|---|---|---|
| 3,950,507 | A | * | 4/1976 | Boreskov et al. | 423/626 |
| 4,989,794 | A | | 2/1991 | Askew et al. | |
| 5,127,950 | A | * | 7/1992 | Bongartz et al. | 106/401 |
| 5,225,229 | A | * | 7/1993 | Martin et al. | 423/629 |
| 5,306,480 | A | | 4/1994 | Brown | |
| 5,378,753 | A | * | 1/1995 | Brown | 524/430 |
| 6,130,283 | A | * | 10/2000 | Nippa et al. | 524/437 |
| 6,413,308 | B1 | * | 7/2002 | Xu et al. | 106/415 |
| 6,887,454 | B1 | * | 5/2005 | Bilandzic et al. | 423/629 |
| 7,417,087 | B2 | * | 8/2008 | Nippa et al. | 524/437 |
| 7,438,977 | B2 | * | 10/2008 | Takemura | 428/402 |
| 7,829,619 | B2 | * | 11/2010 | Dittmar et al. | 524/444 |
| 7,959,895 | B2 | * | 6/2011 | Herbiet et al. | 423/629 |

(Continued)

FOREIGN PATENT DOCUMENTS

DE 10248174 C1 11/2003
DE WO2005009904 A 2/2005

(Continued)

OTHER PUBLICATIONS

"Aluminum oxide". Obtained from http://chemicalland21.com. No Author, No Date.*

(Continued)

*Primary Examiner* — Mark Eashoo
*Assistant Examiner* — Michael A Salvitti
(74) *Attorney, Agent, or Firm* — James A. Jubinsky; Marcy M. Hoefling; Nathan C. Dunn

(57) ABSTRACT

Aluminum hydroxide flame-retardants and their use.

7 Claims, 11 Drawing Sheets

(56) References Cited

U.S. PATENT DOCUMENTS

| | | | |
|---|---|---|---|
| 2003/0119963 A1* | 6/2003 | Nippa et al. | 524/437 |
| 2004/0147659 A1* | 7/2004 | Sauerwein et al. | 524/437 |
| 2006/0246000 A1* | 11/2006 | Dolling et al. | 423/625 |
| 2006/0280676 A1* | 12/2006 | Dolling et al. | 423/625 |
| 2010/0152354 A1* | 6/2010 | Herbiet et al. | 524/437 |
| 2010/0160541 A1* | 6/2010 | Herbiet et al. | 524/585 |

FOREIGN PATENT DOCUMENTS

| | | |
|---|---|---|
| EP | 0469257 A2 | 2/1992 |
| EP | WO0151419 A | 7/2001 |
| EP | 1206412 B1 | 9/2003 |
| EP | 1380540 A | 1/2004 |
| JP | 2003286372 A | 10/2003 |
| WO | WO2007047528 A | 4/2007 |

OTHER PUBLICATIONS

Hart L D, "Alumina Chemicals (Science and Technology Handbook), Passage: Methods to Produce Aluminum Hydroxide" 1990, American Ceramic Society, Westerville, US, XP002409801.

Announcement Albemarle, [Online], "Datasheet Martinal OL-111 LE / OL-107 LE / OL-104 LE", Sep. 2004, pp. 1-2, XP002410384.

* cited by examiner

US 8,642,001 B2

ALUMINUM HYDROXIDE

REFERENCE TO RELATED APPLICATION

This application is the National Stage of International Patent Appl. No. PCT/IB2007/004663, filed on Jun. 21, 2007, the disclosure of which is incorporated herein by reference.

FIELD OF THE INVENTION

The present invention relates to novel aluminum hydroxide flame retardants and their use.

BACKGROUND OF THE INVENTION

Aluminum hydroxide has a variety of alternative names such as aluminum hydrate, aluminum trihydrate etc., but is commonly referred to as ATH. ATH particles find use as a filler in many materials such as, for example, plastics, rubber, thermosets, papers, etc. These products find use in diverse commercial applications such as wire and cable compounds, conveyor belts, thermoplastics moldings, wall claddings, floorings, etc. ATH is typically used to improve the flame retardancy of such materials and also acts as a smoke suppressant.

Methods for the synthesis of ATH are well known in the art. For example, see EP 1 206 412 B1 describes the production of fine precipitated aluminum hydroxide grades wherein a pregnant liquor obtained from the Bayer process is seeded with bayerite crystals. By using controlled conditions during crystallization, tailor made ATH grades with consistent product qualities can be produced. The ATH grades are typically distinguished by two important characteristics, the median particle size, commonly referred to as $d_{50}$, and the specific surface, commonly referred to as the BET specific surface area, and these two characteristics are major criteria to select an ATH for a specific application.

However, ATH's are not selected solely on their $d_{50}$ and/or BET specific surface areas. To the contrary, ATH's are also selected based on the compounding performance of the ATH-containing resin, and the demand for better compounding performance has increased. The compounding performance of an ATH-containing resin is generally determined by viewing the power draw on the motor of the compounding machine used in compounding the ATH-containing resin. Less variations of the power draw on the motor of the compounding machine translates to less wear on the compounder engine, better compounded resins, and higher throughputs of the ATH-containing resin during compounding.

Thus, because there is a demand for higher throughputs in the compounding of ATH-flame retarded resins and the performance of the ATH-flame retarded synthetic resin is a critical attribute that is linked to the ATH, compounders would benefit from, and thus there is a demand for, an ATH which, during compounding, would allow for higher throughputs in compounding machines like Buss Ko-kneaders, twin-screw extruders or other suitable machines.

SUMMARY OF THE INVENTION

Figure 1:
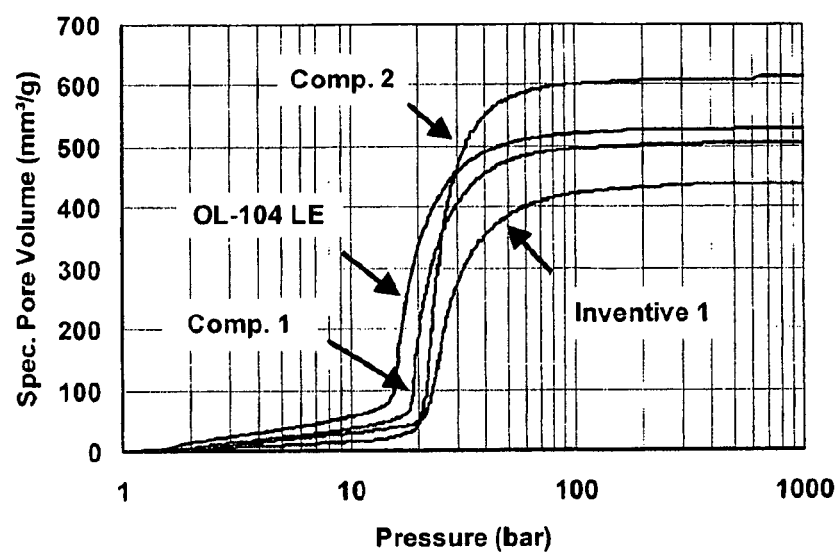
FIG. 1 shows the specific pore volume V as a function of the applied pressure for the second intrusion test run and an ATH grade no. 1, an ATH according to the present invention, in comparison with standard grades.

Higher compounding throughputs can be achieved through the use of ATH's with better wettability in the selected synthetic material. An ATH with a poor wettability in the synthetic resin leads to higher variations in the power draw of the compounder motor during compounding, which in turn leads to, at best, a moderate compound quality, low throughputs, and, over time, can represent a considerable risk for damage to the engine of the compounding machine.

In one embodiment, the present invention relates to ATH particles having a median pore radius in the range of from about 0.09 to about 0.33 µm.

In another embodiment, the present invention relates to ATH particles having a median pore radius in the range of from about 0.09 to about 0.33 µm and a maximum specific pore volume of from about 300 to about 700 mm³/g.

In yet another embodiment, the present invention relates to ATH particles having:

a $d_{50}$ in the range of from 0.5 to about 2.5 µm;

a BET specific surface area of from about 1 to about 15 m²/g; and a median pore radius in the range of from about 0.09 to about 0.33 µm.

In still yet another embodiment, the present invention relates to ATH particles having:

i) a BET specific surface area of from about 3 to about 6 $m^2/g$; and
a maximum specific pore volume of from about 390 to about 480 $mm^3/g$;
or
ii) a BET specific surface area of from about 6 to about 9 $m^2/g$; and
a maximum specific pore volume of from about 400 to about 600 $mm^3/g$ or
iii) a BET specific surface area of from about 9 to about 15 $m^2/g$; and
a maximum specific pore volume of from about 300 to about 700 $mm^3/g$.

In yet another embodiment, the present invention relates to a flame retarded polymer formulation comprising at least one synthetic resin and a flame retarding amount of ATH particles having a median pore radius in the range of from about 0.09 to about 0.33 μm.

DETAILED DESCRIPTION OF THE INVENTION

The wettability of ATH particles with resins depends on the morphology of the ATH particles, and the inventors hereof have unexpectedly discovered that the ATH particles according to the present invention have an improved wettability in relation to ATH particles currently available. While not wishing to be bound by theory, the inventors hereof believe that this improved wettability is attributable to an improvement in the morphology of the ATH particles disclosed herein.

Again, while not wishing to be bound by theory, the inventors hereof believe that this improved morphology is attributable to the specific pore volume and/or the median pore radius ("$r_{50}$") of the ATH product particles of the present invention. The inventors hereof believe that, for a given polymer molecule, an ATH product having a higher structured aggregate contains more and bigger pores and seems to be more difficult to wet, leading to difficulties (higher variations of the power draw on the motor) during compounding in kneaders like Buss Ko-kneaders or twin-screw extruders or other machines known in the art and used to this purpose. Therefore, the inventors hereof have discovered that an ATH filler characterized by smaller median pore sizes and/or lower total pore volumes correlates with an improved wetting with polymeric materials and thus results in improved compounding behavior. i.e. less variations of the power draw of the engines (motors) of compounding machines used to compound a flame retarded resin containing the ATH filler.

ATH Particles of the Present Invention

The aluminum hydroxide particles according to the present invention are characterized by a certain median pore radius and/or a lower total specific pore volume at 1000 bar, $V_{max}$, as determined by mercury porosimetry. The $r_{50}$ and the $V_{max}$ of the ATH particles according to the present invention can be derived from mercury porosimetry. The theory of mercury porosimetry is based on the physical principle that a nonreactive, non-wetting liquid will not penetrate pores until sufficient pressure is applied to force its entrance. Thus, the higher the pressure necessary for the liquid to enter the pores, the smaller the pore size. A smaller pore size and/or a lower total specific pore volume was found to correlate to better wettability of the aluminum hydroxide particles. The pore size of the aluminum hydroxide particles of the present invention can be calculated from data derived from mercury porosimetry using a Porosimeter 2000 from Carlo Erba Strumentazione, Italy. According to the manual of the Porosimeter 2000, the following equation is used to calculate the pore radius r from the measured pressure p: $r = -2\,\gamma\,\cos(\theta)/p$; wherein $\theta$ is the wetting angle and $\gamma$ is the surface tension. The measurements taken herein used a value of 141.3° for $\theta$ and $\gamma$ was set to 480 dyn/cm.

In order to improve the repeatability of the measurements, the pore size of the ATH particles was calculated from the second ATH intrusion test run, as described in the manual of the Porosimeter 2000. The second test run was used because the inventors observed that an amount of mercury having the volume $V_0$ remains in the sample of the ATH particles after extrusion, i.e. after release of the pressure to ambient pressure. Thus, the $r_{50}$ can be derived from this data as explained below with reference to FIGS. 1, 2, and 3.

In the first test run, an ATH sample was prepared as described in the manual of the Porosimeter 2000, and the pore volume was measured as a function of the applied intrusion pressure p using a maximum pressure of 1000 bar. The pressure was released and allowed to reach ambient pressure upon completion of the first test run. A second intrusion test run (according to the manual of the Porosimeter 2000) utilizing the same ATH sample, unadulterated, from the first test run was performed, where the measurement of the specific pore volume V(p) of the second test run takes the volume $V_0$ as a new starting volume, which is then set to zero for the second test run.

In the second intrusion test run, the measurement of the specific pore volume V(p) of the sample was again performed as a function of the applied intrusion pressure using a maximum pressure of 1000 bar. FIG. 1 shows the specific pore volume V as a function of the applied pressure for the second intrusion test nm and an ATH, grade no. 1, according to the present invention in comparison with current commercially available ATH products. The pore volume at 1000 bar, i.e. the maximum pressure used in the measurement, is referred to as $V_{max}$ herein.

Figure 2:
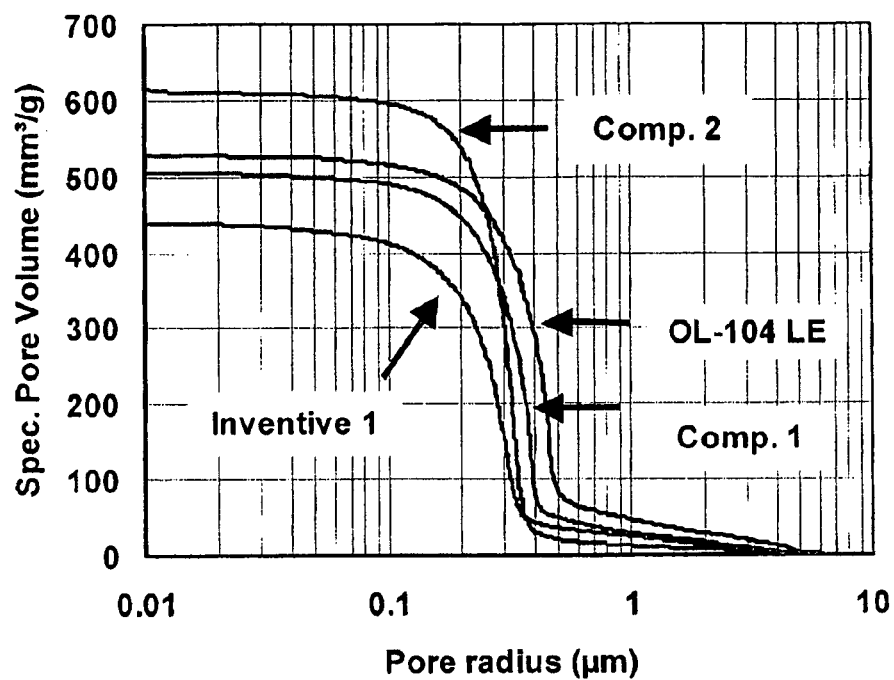
FIG. 2 shows the specific pore volume V plotted against the pore radius r for the second intrusion test run and an ATH grade no. 1, an ATH according to the present invention, in comparison with standard grades.

From the second ATH intrusion test run, the pore radius r was calculated by the Porosimeter 2000 according to the formula $r = -2\,\gamma\,\cos(\theta)/p$; wherein $\theta$ is the wetting angle, $\gamma$ is the surface tension and p the intrusion pressure. For all r-measurements taken herein, a value of 141.3° for $\theta$ was used and $\gamma$ was set to 480 dyn/cm. The specific pore volume can thus be plotted against the pore radius r. FIG. 2 shows the specific pore volume V of the second intrusion test run (using the same sample) plotted against the pore radius r.

Figure 3:
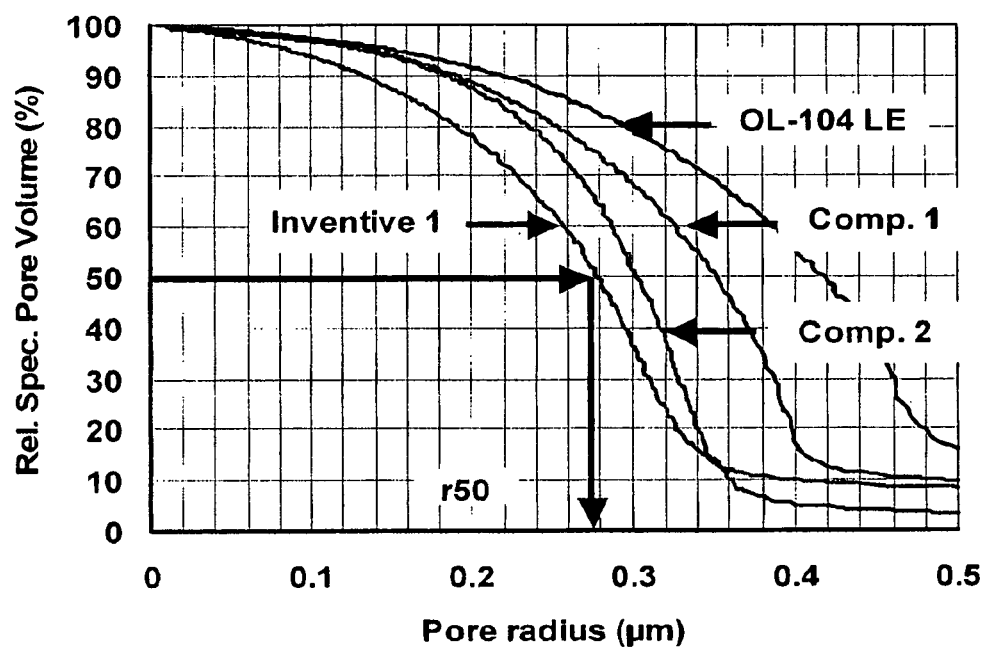
FIG. 3 shows the normalized specific pore volume for an ATH grade no. 1, an ATH according to the present invention, in comparison with standard grades, the graph was generated with the maximum specific pore volume for each ATH grade set at 100%, and the other specific volumes of the corresponding ATH grade were divided by this maximum value.

FIG. 3 shows the normalized specific pore volume of the second intrusion test run plotted against the pore radius r, i.e. in this curve, the maximum specific pore volume of the second intrusion test run, $V_{max}$, was set to 100% and the other specific volumes for that particular ATH were divided by this maximum value. The pore radius at 50% of the relative specific pore volume, by definition, is called median pore radius $r_{50}$ herein. For example, according to FIG. 3, the median pore radius $r_{50}$ for an ATH according to the present invention, i.e. Inventive 1, is 0.277 μm.

The procedure described above was repeated using a sample of ATH particles according to the present invention, and the ATH particles were found to have an $r_{50}$, i.e. a pore radius at 50% of the relative specific pore volume, in the range of from about 0.09 to about 0.33 μm. In preferred embodiments of the present invention, the $r_{50}$ of the ATH particles is in the range of from about 0.20 to about 0.33 μm, more preferably in the range of from about 0.2 to about 0.3 μm. In other preferred embodiments, the $r_{50}$ is in the range of from about 0.185 to about 0.325 μm, more preferably in the range of from about 0.185 to about 0.25 μm. In still other preferred embodiments, the $r_{50}$ is in the range of from about 0.09 to about 0.21 µm, more preferably in the range of from about 0.09 to about 0.165 µm.

The ATH particles of the present invention can also be characterized as having a $V_{max}$, i.e. maximum specific pore volume at 1000 bar, in the range of from about 300 to about 700 mm$^3$/g. In preferred embodiments of the present invention, the $V_{max}$ of the ATH particles is in the range of from about 390 to about 480 mm$^3$/g, more preferably in the range of from about 410 to about 450 mm$^3$/g. In other preferred embodiments, the $V_{max}$ is in the range of from about 400 to about 600 mm$^3$/g, more preferably in the range of from about 450 to about 550 mm$^3$/g. In yet other preferred embodiments, the $V_{max}$ is in the range of from about 300 to about 700 mm$^3$/g, more preferably in the range of from about 350 to about 550 mm$^3$/g.

The ATH particles of the present invention can also be characterized as having an oil absorption, as determined by ISO 787-5:1980 of in the range of from about 1 to about 35%. In some preferred embodiments, the ATH particles of the present invention are characterized as having an oil absorption in the range of from about 23 to about 30%, more preferably in the range of from about 25% to about 28%. In other preferred embodiments, the ATH particles of the present invention are characterized as having an oil absorption in the range of from about 25% to about 32%, more preferably in the range of from about 26% to about 30%. In yet other preferred embodiments, the ATH particles of the present invention are characterized as having an oil absorption in the range of from about 25 to about 35% more preferably in the range of from about 27% to about 32%. In other embodiments, the oil absorption of the ATH particles according to the present invention are in the range of from about 19% to about 23%, and in still other embodiments, the oil absorption of the ATH particles according to the present invention is in the range of from about 21% to about 25%.

The ATH particles according to the present invention can also be characterized as having a BET specific surface area, as determined by DIN-66132, in the range of from about 1 to 15 m$^2$/g. In preferred embodiments, the ATH particles according to the present invention have a BET specific surface in the range of from about 3 to about 6 m$^2$/g, more preferably in the range of from about 3.5 to about 5.5 m$^2$/g. In other preferred embodiments, the ATH particles according to the present invention have a BET specific surface of in the range of from about 6 to about 9 m$^2$/g, more preferably in the range of from about 6.5 to about 8.5 m$^2$/g. In still other preferred embodiments, the ATH particles according to the present invention have a BET specific surface in the range of from about 9 to about 15 m$^2$/g, more preferably in the range of from about 10.5 to about 12.5 m$^2$/g.

The ATH particles according to the present invention can also be characterized as having a $d_{50}$ in the range of from about 0.5 to 2.5 µm. In preferred embodiments, the ATH particles according to the present invention have a $d_{50}$ in the range of from about 1.5 to about 2.5 µm, more preferably in the range of from about 1.8 to about 2.2 µm. In other preferred embodiments, the ATH particles according to the present invention have a $d_{50}$ in the range of from about 1.3 to about 2.0 µm, more preferably in the range of from about 1.4 to about 1.8 µm. In still other preferred embodiments, the ATH particles according to the present invention have a $d_{50}$ in the range of from about 0.9 to about 1.8 µm, more preferably in the range or from about 1.1 to about 1.5 µm.

It should be noted that all particle diameter measurements, i.e. $d_{50}$, disclosed herein were measured by laser diffraction using a Cilas 1064 L laser spectrometer from Quantachrome.

Generally, the procedure used herein to measure the $d_{50}$, can be practiced by first introducing a suitable water-dispersant solution (preparation see below) into the sample-preparation vessel of the apparatus. The standard measurement called "Particle Expert" is then selected, the measurement model "Range 1" is also selected, and apparatus-internal parameters, which apply to the expected particle size distribution, are then chosen. It should be noted that during the measurements the sample is typically exposed to ultrasound for about 60 seconds during the dispersion and during the measurement. After a background measurement has taken place, from about 75 to about 100 mg of the sample to be analyzed is placed in the sample vessel with the water/dispersant solution and the measurement started. The water/dispersant solution can be prepared by first preparing a concentrate from 500 g Calgon, available from KMF Laborchemie, with 3 liters of CAL Polysalt, available from BASF. This solution is made up to 10 liters with deionized water. 100 ml of this original 10 liters is taken and in turn diluted further to 10 liters with deionized water, and this final solution is used as the water-dispersant solution described above.

Making of ATH Particles of the Present Invention

The ATH particles of the present invention can be made by several processes such as, for example, by spray drying a slurry produced from, for example, a process such as that described below, and dry-milling; mill drying a slurry or filter cake produced from, for example, a process such as that described below, with optional deagglomeration; and wet milling followed by spray drying. For example, see those processes disclosed in commonly-owned co-pending applications 60/818,632; 60/899,316; 60/891,746; 60/891,745; 60/818,633; and 60/818,670, which are all incorporated herein by reference in their entirety. In some embodiments, the ATH particles of the present invention are made by a process comprising wet-milling an ATH slurry containing in the range of from about 1 to about 40 wt. %, based on the total weight of the slurry, ATH particles. "Wet-milling" as used herein is meant to refer to the contacting of the ATH slurry with a milling media in the presence of a liquid. Liquids suitable for use in wet-milling herein are any liquids that do not substantially solubilize the ATH, preferably the liquid is water. In some wet-milling processes suitable for producing ATH particles according to the present invention, the slurry may also contain a suitable dispersing agent.

The milling media used in the wet-milling can be balls, rods, or other shapes made of various materials. Some common materials of construction for the milling media include ceramic, steel, aluminum, glass or zirconium oxide ($ZrO_2$). For ceramic milling media, the density should be above 2.5 g/cm$^3$. Preferably, metal-based milling media with a density of at least 1.5 g/cm$^3$ are used, preferably in the range of from about 2.0 to about 2.5 g/cm$^3$. In preferred wet-milling processes, the milling media is selected from those media having a general spherical shape, more preferably spherical milling media having a diameter in the range of from about 0.1 mm to about 1.0 mm, more preferably the milling media is a zirconium milling media, most preferably zirconium oxide.

The ATH slurry that is wet-milled in the practice of the present invention can be obtained from any process used to produce ATH particles. Preferably the slurry is obtained from a process that involves producing ATH particles through precipitation and filtration.

The wet-milling of the ATH slurry results in a milled ATH slurry that is recovered from the wet-milling operation by any technique commonly used to recover milled products from wet-milling operations. The recovered milled ATH slurry is then subjected to drying. Any drying method known in the art that is suitable for drying an ATH slurry can be used. Non-limiting examples of drying methods include spray drying, using spray driers such as those available from the Niro company/Sweden, flash drying or cell mill drying using mill-driers commercially available from the Atritor company or those available from Altenburger Maschinen Jaeckering, GmbH. In some embodiments, the milled ATH slurry is spray dried, and in other embodiments, the milled ATH slurry is dried using a mill-drier.

Use as a Flame Retardant

The ATH particles according to the present invention can be used as a flame retardant in a variety of synthetic resins. Non-limiting examples of thermoplastic resins where the ATH particles find use include polyethylene, ethylene-propylene copolymer, polymers and copolymers of $C_2$ to $C_8$ olefins (α-olefin) such as polybutene, poly(4-methylpentene-1) or the like, copolymers of these olefins and diene, ethylene-acrylate copolymer, polystyrene, ABS resin, AAS resin, AS resin, MBS resin, ethylene-vinyl chloride copolymer resin, ethylene-vinyl acetate copolymer resin, ethylene-vinyl chloride-vinyl acetate graft polymer resin, vinylidene chloride, polyvinyl chloride, chlorinated polyethylene, vinyl chloride-propylene copolymer, vinyl acetate resin, phenoxy resin, and the like. Further examples of suitable synthetic resins include thermosetting resins such as epoxy resin, phenol resin, melamine resin, unsaturated polyester resin, alkyd resin and urea resin and natural or synthetic rubbers such as EPDM, butyl rubber, isoprene rubber, SBR, NIR, urethane rubber, polybutadiene rubber, acrylic rubber, silicone rubber, fluoroelastomer, NBR and chloro-sulfonated polyethylene are also included. Further included are polymeric suspensions (latices).

Preferably, the synthetic resin is a polyethylene-based resins such as high-density polyethylene, low-density polyethylene, linear low-density polyethylene, ultra low-density polyethylene, EVA (ethylene-vinyl acetate resin), EEA (ethylene-ethyl acrylate resin), EMA (ethylene-methyl acrylate copolymer resin), EAA (ethylene-acrylic acid copolymer resin) and ultra high molecular weight polyethylene; and polymers and copolymers of $C_2$ to $C_8$ olefins (α-olefin) such as polybutene and poly(4-methylpentene-1), polyvinyl chloride and rubbers. In a more preferred embodiment, the synthetic resin is a polyethylene-based resin.

The inventors have discovered that by using the ATH particles according to the present invention as flame retardants in synthetic resins, better compounding performance, of the aluminum hydroxide containing synthetic resin can be achieved. The better compounding performance is highly desired by those compounders, manufactures, etc. producing highly tilled flame retarded compounds and final extruded or molded articles out of ATH-containing synthetic resins. By highly filled, it is meant those containing the flame retarding amount of ATH, discussed below.

By better compounding performance, it is meant that variations in the amplitude of the energy level of compounding machines like Buss Ko-kneaders or twin screw extruders needed to mix a synthetic resin containing ATH particles according to the present invention are smaller than those of compounding machines mixing a synthetic resin containing conventional ATH particles. The smaller variations in the energy level allows for higher throughputs of the ATH-containing synthetic resins to be mixed or extruded and/or a more uniform (homogenous) material.

Thus, in one embodiment, the present invention relates to a flame retarded polymer formulation comprising at least one synthetic resin, selected from those described above, in some embodiments only one and a flame retarding amount of ATH particles according to the present invention, and extruded and/or molded article made from the flame retarded polymer formulation.

By a flame retarding amount of the ATH, it is generally meant in the range of from about 5 wt % to about 90 wt %, based on the weight of the flame retarded polymer formulation, and more preferably from about 20 wt % to about 70 wt %, on the same basis. In a most preferred embodiment, a flame retarding amount is from about 30 wt % to about 65 wt % of the ATH particles, on the same basis.

The flame retarded polymer formulation can also contain other additives commonly used in the art. Non-limiting examples of other additives that are suitable for use in the flame retarded polymer formulations of the present invention include extrusion aids such as polyethylene waxes, Si-based extrusion aids, fatty acids; coupling agents such as amino-, vinyl- or alkyl silanes or maleic acid grafted polymers; sodium stearate or calcium sterate; organoperoxides; dyes; pigments; fillers; blowing agents; deodorants; thermal stabilizers; antioxidants; antistatic agents; reinforcing agents; metal scavengers or deactivators; impact modifiers; processing aids; mold release aids, lubricants; anti-blocking agents; other flame retardants; UV stabilizers; plasticizers; flow aids; and the like. If desired, nucleating agents such as calcium silicate or indigo can be included in the flame retarded polymer formulations also. The proportions of the other optional additives are conventional and can be varied to suit the needs of any given situation.

The methods of incorporation and addition of the components of the flame-retarded polymer formulation is conducted is not critical to the present invention and can be any known in the art so long as the method selected involves substantially uniform mixing. For example, each of the above components, and optional additives if used, can be mixed using a Buss Ko-kneader, internal mixers, Farrel continuous mixers or twin screw extruders or in some cases also single screw extruders or two roll mills. The flame retarded polymer formulation can then be molded in a subsequent processing step, if so desired. In some embodiments, apparatuses can be used that thoroughly mix the components to form the flame retarded polymer formulation and also mold an article out of the flame retarded polymer formulation. Further, the molded article of the flame-retardant polymer formulation may be used after fabrication for applications such as stretch processing, emboss processing, coating, printing, plating, perforation or cutting. The molded article may also be affixed to a material other than the flame-retardant polymer formulation of the present invention, such as a plasterboard, wood, a block board, a metal material or stone. However, the kneaded mixture can also be inflation-molded, injection-molded, extrusion-molded, blow-molded, press-molded, rotation-molded or calender-molded.

In the case of an extruded article, any extrusion technique known to be effective with the synthetic resins mixture described above can be used. In one exemplary technique, the synthetic resin, aluminum hydroxide particles, and optional components, if chosen, are compounded in a compounding machine to form a flame-retardant resin formulation as described above. The flame-retardant resin formulation is then heated to a molten state in an extruder, and the molten flame-retardant resin formulation is then extruded through a selected die to form an extruded article or to coat for example a metal wire or a glass fiber used for data transmission.

The above description is directed to several embodiments of the present invention. Those skilled in the art will recognize that other means, which are equally effective, could be devised for carrying out the spirit of this invention. It should also be noted that preferred embodiments of the present invention contemplate that all ranges discussed herein include ranges from any lower amount to any higher amount. For example, a flame retarding amount of the ATH, can also include amounts in the range of about 70 to about 90 wt. %, 20 to about 65 wt. %, etc. The following examples will illustrate the present invention, but are not meant to be limiting in any manner.

EXAMPLES

The $r_{50}$ and $V_{max}$ described in the examples below was derived from mercury porosimetry using a Porosimeter 2000, as described above. All $d_{50}$, BET, oil absorption, etc., unless otherwise indicated, were measured according to the techniques described above. Also, the term "inventive aluminum hydroxide grade" and "inventive filler" as used in the examples is meant to refer to an ATH according to the present invention, and "comparative aluminum hydroxide grade" is meant to refer to an ATH that is commercially available and not according to the present invention.

Example 1

By seeding a pregnant sodium aluminate liquor as e.g. disclosed in EP 1 206 412 B1, a synthetic aluminium hydroxide grade with a median particle size of $d_{50}$=2.43 μm and a specific surface of 2.6 m²/g was produced. Common separation and filtration techniques were used to separate said synthetic aluminum hydroxide; after subsequent washing steps on belt filters, the resulting aluminum hydroxide filter paste with a solid content of 61 wt. % was liquefied by adding a sufficient quantity of the dispersing agent Antiprex A40 from Ciba until the viscosity of the slurry was about 150 cPoise. The slurry was fed into a pearl mill, type KD 200 D from Bachofen/Switzerland. This mill contained 270 kg of small beads made of zirconium oxide with a diameter of 0.6 mm. The throughput of the mill was controlled so that after drying by means of a Niro F 100 spray drier and conveying of the inventive aluminum hydroxide into a silo the resulting $d_{50}$ was 1.89 μm and the specific surface was 4.9 m²/g. In the present example, the throughput was about 3 m³/h. FIG. 1 shows the specific pore volume of the inventive aluminum hydroxide grade no. 1 as a function of the applied pressure of the second intrusion test run. FIG. 2 shows the specific pore volume of the inventive aluminum hydroxide grade no. 1 as a function of the pore radius. FIG. 3 shows the normalized specific pore volume of the inventive aluminum hydroxide grade no. 1 as a function of the pore radius on a linear scale. The product properties of the inventive aluminum hydroxide grade no. 1 are contained in Table 1, below.

Example 2

Comparative

The product properties of the comparative aluminum hydroxide grade Martinal OL-104 LE produced by Martinswerk GmbH and the product properties of two competitive aluminum hydroxide grades "Competitive 1" and "Competitive 2" are also shown in Table 1.

TABLE 1

|  | Median pore radius ("$r_{50}$") (μm) | Maximum specific pore volume $V_{max}$ (mm³/g) | Median particle size $d_{50}$ (μm) | Specific BET surface (m²/g) |
| --- | --- | --- | --- | --- |
| Comparative ATH OL-104 LE | 0.419 | 529 | 1.83 | 3.2 |
| Comparative 1 | 0.353 | 504 | 1.52 | 3.2 |
| Comparative 2 | 0.303 | 615 | 1.61 | 4.0 |
| Inventive ATH grade no. 1 | 0.277 | 439 | 1.89 | 4.9 |

As can be seen in Table 1, the inventive aluminum hydroxide grade no. 1, an ATH according to the present invention, has the lowest median pore radius and the lowest maximum specific pore volume.

Example 3

Figure 4:
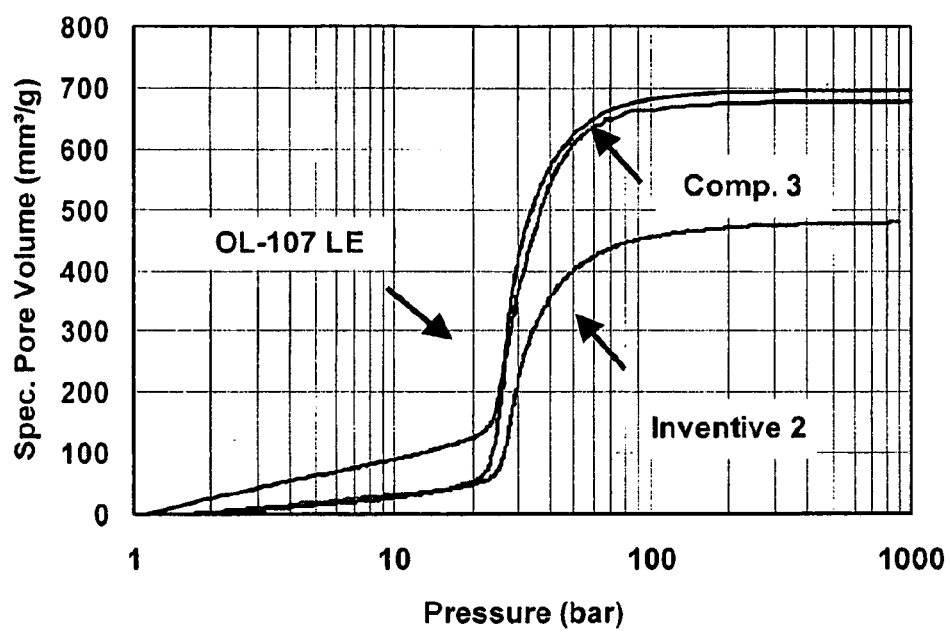
FIG. 4 shows the specific pore volume V as a function of the applied pressure for the second intrusion test run and an ATH grade no. 2, an ATH according to the present invention, in comparison with standard grades.
Figure 5:
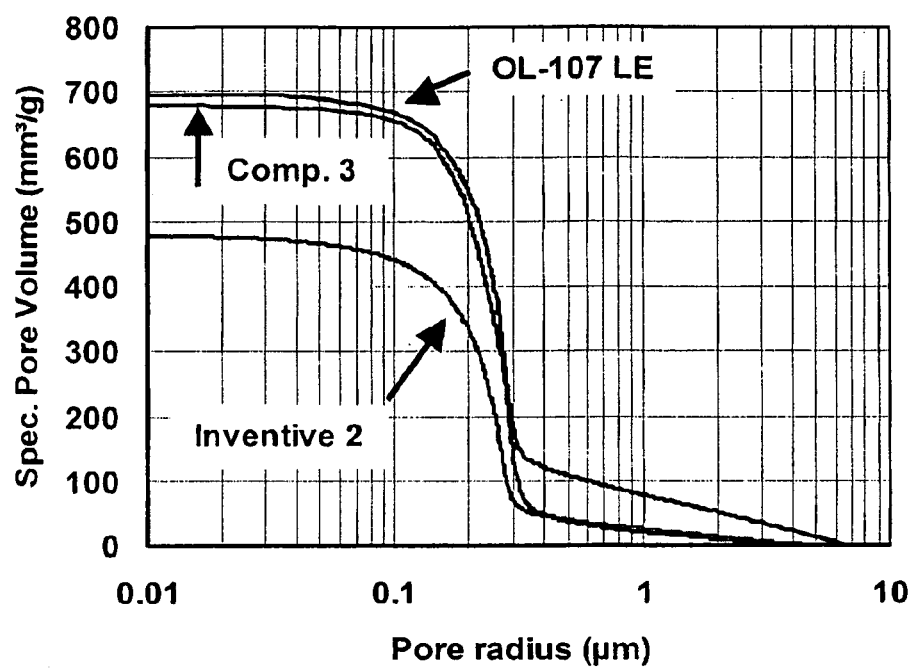
FIG. 5 shows the specific pore volume V plotted against the pore radius r for the second intrusion test run and an ATH grade no. 2, an ATH according to the present invention, in comparison with standard grades.
Figure 6:
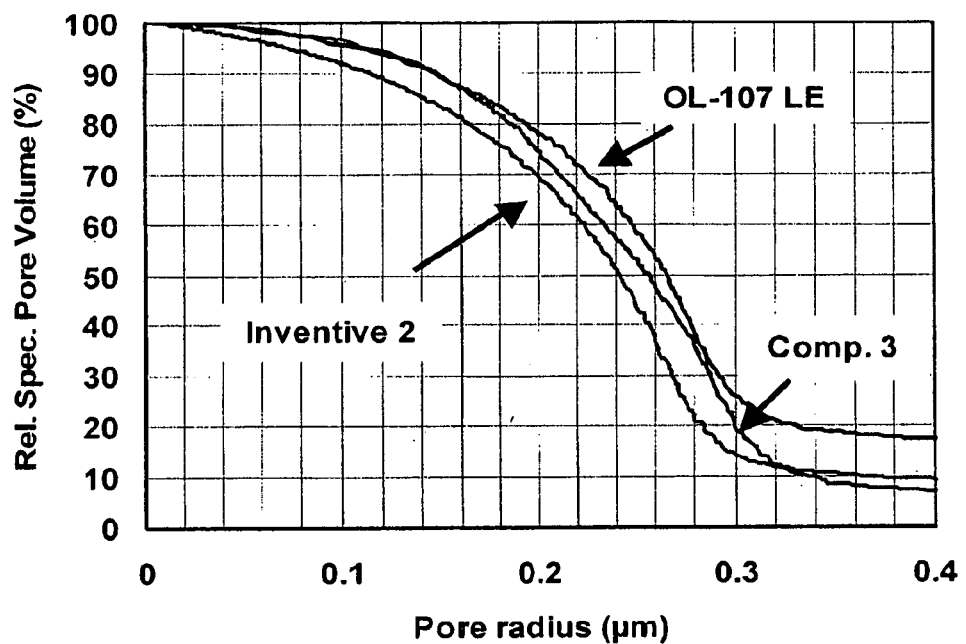
FIG. 6 shows the normalized specific pore volume for an ATH grade no. 2, an ATH according to the present invention, in comparison with standard grades, the graph was generated with the maximum specific pore volume for each ATH grade set at 100%, and the other specific volumes of the corresponding ATH grade were divided by this maximum value.

By seeding a pregnant sodium illuminate liquor as e.g. disclosed in EP 1 206 412 B1, a synthetic aluminium hydroxide grade with a median particle size of $d_{50}$=2.43 μm and a specific surface of 2.6 m²/g was produced. Common separation and filtration techniques were used to separate said synthetic aluminum hydroxide; after subsequent washing steps on belt filters, the resulting aluminum hydroxide filter paste with a solid content of 61 wt. % was liquefied by adding a sufficient quantity of the dispersing agent Antiprex A40 from Ciba until the viscosity of the slurry was about 150 cPoise. The slurry was fed into a pearl mill, type KD 200 D from Bachofen/Switzerland. This mill contained 270 kg of small beads made of zirconium oxide with a diameter of 0.6 mm. The throughput of the mill was controlled so that after drying by means of a Niro F 100 spray drier and conveying of the inventive aluminum hydroxide into a silo the resulting $d_{50}$ was 1.44 μm and the specific surface was 6.7 m²/g. In the present example, the throughput was about 2 m³/h. FIG. 4 shows the specific pore volume of the inventive aluminum hydroxide grade no. 2 as a function of the applied pressure of the second intrusion test run. FIG. 5 shows the specific pore volume of the inventive aluminum hydroxide grade no. 2 as a function of the pore radius. FIG. 6 shows the normalized specific pore volume of the inventive aluminum hydroxide grade no. 2 as a function of the pore radius on a linear scale. The product properties of the inventive aluminum hydroxide grade no. 2 are contained in Table 2, below.

Example 4

Comparative

The product properties of the comparative aluminum hydroxide grade Martinal OL-107 LE produced by Martinswerk GmbH and the product properties of the competitive aluminum hydroxide grade "Competitive 3" are also shown in Table 2.

TABLE 2

|  | Median pore radius ("$r_{50}$") (μm) | Maximum specific pore volume $V_{max}$ (mm³/g) | Median particle size $d_{50}$ (μm) | Specific BET surface (m²/g) |
| --- | --- | --- | --- | --- |
| Comparative ATH OL-107 LE | 0.266 | 696 | 1.35 | 6.2 |
| Comparative 3 | 0.257 | 679 | 1.23 | 6.3 |
| Inventive ATH grade no. 2 | 0.242 | 479 | 1.44 | 6.7 |

As can be seen in Table 2, the inventive aluminum hydroxide grade no. 2 has the lowest median pore radius and the lowest maximum specific pore volume.

Example 5

Figure 7:
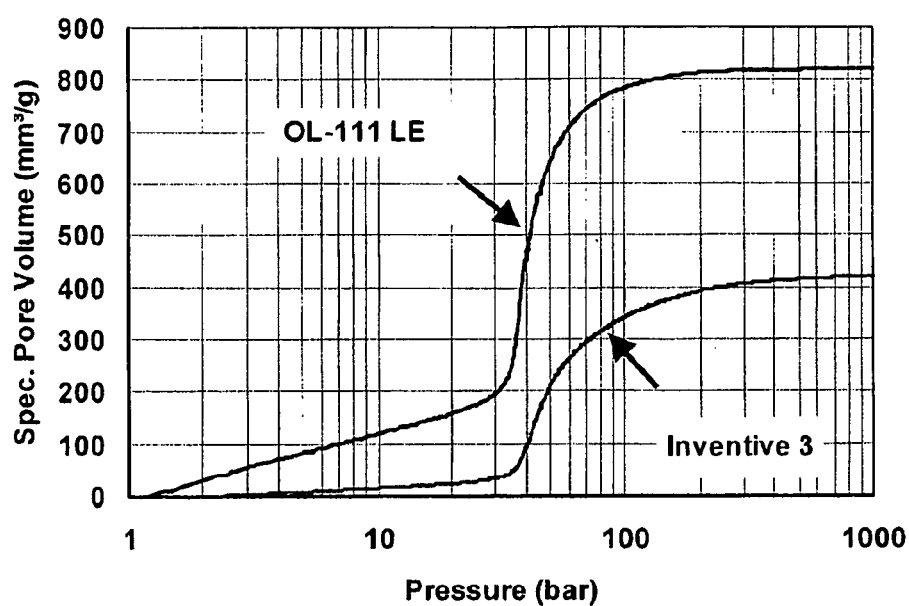
FIG. 7 shows the specific pore volume V as a function of the applied pressure for the second intrusion test run and an ATH grade no. 3, an ATH according to the present invention, in comparison with a standard grade.
Figure 8:
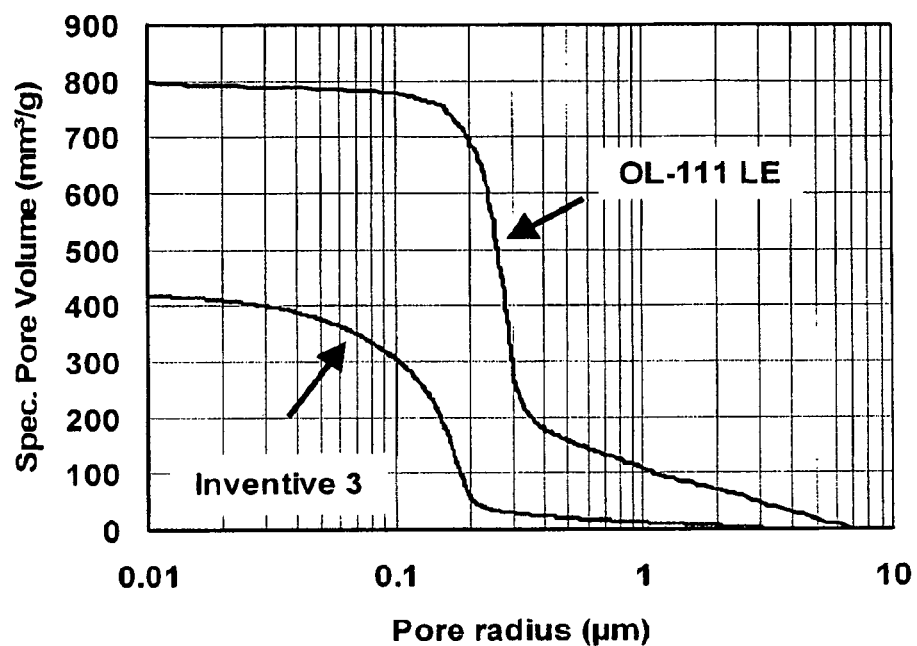
FIG. 8 shows the specific pore volume V plotted against the pore radius r for the second intrusion test run and an ATH grade no. 3, an ATH according to the present invention, in comparison with a standard grade.
Figure 9:
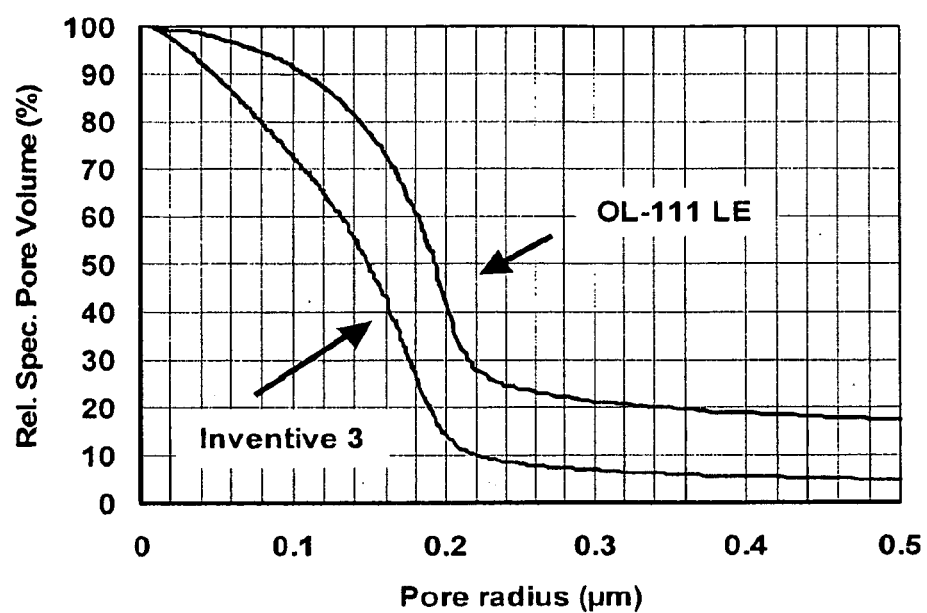
FIG. 9 shows the normalized specific pore volume for an ATH grade no. 3, an ATH according to the present invention, in comparison with standard grades, the graph was generated with the maximum specific pore volume for each ATH grade set at 100%, and the other specific volumes of the corresponding ATH grade were divided by this maximum value.

By seeding a pregnant sodium aluminate liquor as e.g. disclosed in EP 1 206 412 B1, a synthetic aluminium hydroxide grade with a median particle size of $d_{50}$=2.43 µm and a specific surface of 2.6 m²/g was produced. Common separation and filtration techniques were used to separate said synthetic aluminum hydroxide; after subsequent washing steps on belt filters, the resulting aluminum hydroxide filter paste with a solid content of 61 wt. % was liquefied by adding a sufficient quantity of the dispersing agent Antiprex A40 from Ciba until the viscosity of the slurry was about 150 cPoise. The slurry was fed into a pearl mill, type KD 200 D from Bachofen/Switzerland. This mill contained 270 kg of small beads made of zirconium dioxide with a diameter of 0.6 mm. The throughput of the mill was controlled so that after drying by means of a Niro F 100 spray drier and conveying of the inventive aluminum hydroxide into a silo the resulting $d_{50}$ was 1.36 µm and the specific surface was 10.0 m²/g. In the present example, the throughput was about 0.75 m³/h. FIG. 7 shows the specific pore volume of the inventive aluminum hydroxide grade no. 3 as a function of the applied pressure of the second intrusion test run. FIG. 8 shows the specific pore volume of the inventive aluminum hydroxide grade no. 3 as a function of the pore radius. FIG. 9 shows the normalized specific pore volume of the inventive aluminum hydroxide grade no. 3 as a function of the pore radius on a linear scale. The product properties of the inventive aluminum hydroxide grade no. 3 are contained in Table 3, below.

Example 6

Comparative

The product properties of the comparative aluminum hydroxide grade Martinal OL-111 LE produced by Martinswerk GmbH are also shown in Table 2.

TABLE 3

| | Median pore radius ("$r_{50}$") (µm) | Maximum specific pore volume $V_{max}$ (mm³/g) | Median particle size $d_{50}$ (µm) | Specific BET surface (m²/g) |
|---|---|---|---|---|
| Comparative ATH OL-111 LE | 0.193 | 823 | 1.23 | 10.1 |
| Inventive ATH grade no. 3 | 0.175 | 588 | 1.36 | 10.0 |

As can be seen in Table 3, the inventive aluminum hydroxide grade no. 3 has a lower median pore radius and a lower maximum specific pore volume.

Example 7

396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the inventive aluminum hydroxide grade no. 1 in a usual manner familiar to a person skilled in the art, together with 4.8 g (1.2 phr) of aminosilane AMEO from Degussa AG and 2.9 g (0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 4, below.

Example 8

Comparative 396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the commercially available ATH grade OL-104 LE produced by Martinswerk GmbH in a usual manner familiar to a person skilled in the art, together with 4.8 g (1.2 phr) of aminosilane AMEO from Degussa AG and 2.9 g (=0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 4, below.

TABLE 4

| | Comparative with OL-104 LE | Inventive filler no. 1 |
|---|---|---|
| Melt Flow Index @ 150° C./21.6 kg (g/10 min) | 1.8 | 1.5 |
| Tensile strength (MPa) | 12.9 | 13.4 |
| Elongation at break (%) | 221 | 214 |
| LOI (% $O_2$) | 36.2 | 38 |
| Resistivity before water aging (Ohm · cm) | $3.1 \times 10^{12}$ | $1.7 \times 10^{12}$ |
| Resistivity after 7 d@70° C. water aging (Ohm · cm) | $8.1 \times 10^{11}$ | $8.4 \times 10^{11}$ |
| Water pickup (%) | 1.25 | 1.67 |

As can be seen in Table 4, within the experimental error, the inventive aluminum hydroxide grade no. 1 has similar mechanical, rheological, electrical and flame retardant properties as the comparative grade Martinal OL-104 LE.

Example 9

396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the inventive filler no. 2 in a usual manner familiar to a person skilled in the art, together with 4.8 g (1.2 phr) of aminosilane AMEO from Degussa AG and 2.9 g (0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 5, below.

Example 10

Comparative 396.9 g (100 phr) of ethylene vinyl acetate (EVA) Escorene Ultra UL00119 from ExxonMobil was mixed during about 20 min on a two roll mill W150M from the Collin company with 595.4 g (150 phr) of the commercially available ATH grade OL-107 LE produced by Martinswerk GmbH in a usual manner familiar to a person skilled in the art, together with 4.8 g (1.2 phr) of aminosilane AMEO from Degussa AG and 2.9 g (=0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 5, below.

TABLE 5

|  | Comparative with OL-107 LE | Inventive filler no. 2 |
|---|---|---|
| Melt Flow Index @ 150° C./21.6 kg (g/10 min) | 1.1 | 1.25 |
| Tensile strength (MPa) | 13.9 | 13.6 |
| Elongation at break (%) | 204 | 203 |
| LOI (% $O_2$) | 38.7 | 38.2 |
| Resistivity before water aging (Ohm · cm) | $2.6 \times 10^{12}$ | $1.5 \times 10^{12}$ |
| Resistivity after 7 d@70° C. water aging (Ohm · cm) | $6.3 \times 10^{11}$ | $7.9 \times 10^{11}$ |
| Water pickup (%) | 2.78 | 1.67 |

As can be seen in Table 5, within the experimental error, the inventive aluminum hydroxide grade no. 2 has similar mechanical, rheological, electrical and flame retardant properties as the comparative grade Martinal® OL-107 LE.

Example 11

396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the inventive filler no. 3 in a usual manner familiar to a person skilled in the art, together with 4.8 g (1.2 phr) of aminosilane AMEO from Degussa AG and 2.9 g (0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 6, below.

Example 12

Comparative 396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the commercially available ATH grade OL-111 LE produced by Martinswerk GmbH in a usual manner familiar to a person skilled in the art, together with 4.8 g (1.2 phr) of aminosilane AMEO from Degussa AG and 2.9 g (0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 6, below.

TABLE 6

|  | Comparative with OL-111 LE | Inventive filler no. 3 |
|---|---|---|
| Melt Flow Index @ 150° C./21.6 kg (g/10 min) | 1.13 | 1.22 |
| Tensile strength (MPa) | 15.7 | 15.2 |
| Elongation at break (%) | 183 | 185 |
| LOI (% $O_2$) | 38.6 | 39.6 |

As can be seen in Table 6, within the experimental error, the inventive aluminum hydroxide grade no. 3 has similar mechanical and rheological properties as the comparative grade Martinal® OL-111 LE.

It should be noted that the Melt Flow Index was measured according to DIN 53735. The tensile strength and elongation at break were measured according to DIN 53504, and the resistivity before and after water ageing was measured according to DIN 53482 on 100×100×2 $mm^3$ pressed plates. The water pick-up in % is the difference in weight after water aging of a 100×100×2 $mm^3$ pressed plate in a de-salted water bath after 7 days at 70° C. relative to the initial weight of the plate. The oxygen index was measured according to ISO 4589 on 6×3×150 $mm^3$ samples.

Example 13

The comparative aluminum hydroxide particles Martinal® OL-104 LE of Example 2 and the inventive aluminum hydroxide grade no. 1 of Example 1 were separately used to form a flame-retardant resin formulation. The synthetic resin used was a mixture of EVA Escorene® Ultra UL00328 from ExxonMobil together with a LLDPE grade Escorene® LL1001XV from ExxonMobil, Ethanox® 310 antioxidant available commercially from the Albemarle® Corporation, and an amino silane Dynasylan AMEO from Degussa. The components were mixed on a 46 mm Buss Ko-kneader (L/D ratio=11) at a throughput of 25 kg/h with temperature settings and screw speed chosen in a usual manner familiar to a person skilled in the art. The amount of each component used in formulating the flame-retardant resin formulation is detailed in Table 7, below.

TABLE 7

|  | Phr (parts per hundred total resin) |
|---|---|
| Escorene Ultra UL00328 | 80 |
| Escorene LL1001XV | 20 |
| Aluminum hydroxide | 150 |
| AMEO silane | 1.6 |
| Ethanox 310 | 0.6 |

Figure 10:
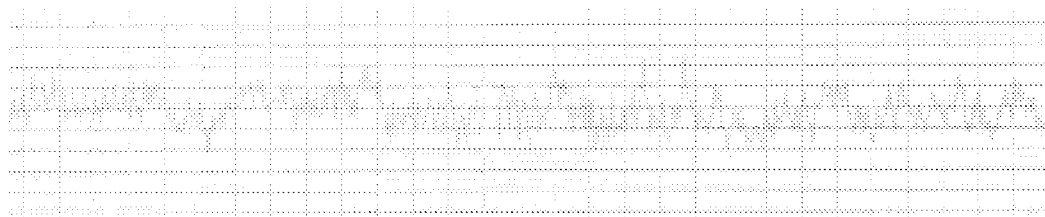
FIG. 10 shows the power draw on the motor of a discharge extruder for the inventive aluminum hydroxide grade no. 1 used in the Example 1.
Figure 11:
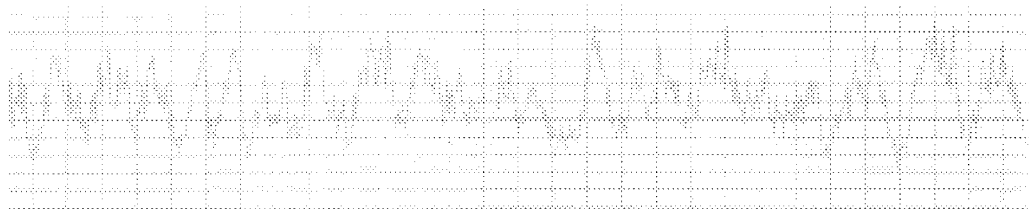
FIG. 11 shows the power draw on the motor of a discharge extruder for the comparative aluminum hydroxide grade OL-104 LE used in Example 2.

In forming the flame-retardant resin formulation, the AMEO silane and Ethanox® 310 were first blended with the total amount of synthetic resin in a drum prior to Buss compounding. By means of loss in weight feeders, the resin/silane/antioxidant blend was fed into the first inlet of the Buss kneader, together with 50% of the total amount of aluminum hydroxide, and the remaining 50% of the aluminum hydroxide was fed into the second feeding port of the Buss kneader. The discharge extruder was flanged perpendicular to the Buss Ko-kneader and had a screw size of 70 mm. FIG. 10 shows the power draw on the motor of the discharge extruder for the inventive aluminum hydroxide grade no. 1. FIG. 11 shows the power draw on the motor of the discharge extruder for the comparative aluminum hydroxide grade OL-104 LE, produced by Martinswerk GmbH.

As demonstrated in FIGS. 10 and 11, variations in the energy (power) draw of the discharge extruder are significantly reduced when the aluminum hydroxide particles according to the present invention are used in the flame-retardant resin formulation. As stated above, smaller variations in energy level allows for higher throughputs and/or a more uniform (homogenous) flame-retardant resin formulation.

What is claimed:

1. Aluminum hydroxide (ATH) particles having:
   a) a BET specific surface area of from about 3 to about 6 $m^2/g$; and a maximum specific pore volume ($V_{max}$) from about 390 to about 480 $mm^3/g$; or
   b) a BET specific surface area of from about 6 to about 9 $m^2/g$; and a maximum specific pore volume from about 450 to about 550 $mm^3/g$; or
   c) a BET specific surface area of from about 9 to about 15 $m^2/g$; and a maximum specific pore volume from about 450 to about 600 $mm^3/g$, wherein the BET specific surface area is determined by DIN-66132.

2. The ATH particles of claim 1 having a BET specific surface area from about 3 to about 6 $m^2/g$; and a maximum specific pore volume of from about 390 to about 480 $mm^3/g$.

3. The ATH particles of claim 1 having a BET specific surface area from about 6 to about 9 $m^2/g$; and a maximum specific pore volume from about 450 to about 550 $mm^3/g$.

4. The ATH particles of claim 1 having a BET specific surface area from about 9 to about 15 $m^2/g$; and a maximum specific pore volume from about 450 to about 600 $mm^3/g$.

5. The ATH particles of claim 2, wherein the ATH particles have an $r_{50}$ in the range from about 0.20 to about 0.33 μm.

6. The ATH particles of claim 3, wherein the ATH particles have an $r_{50}$ in the range from about 0.185 to about 0.325 μm.

7. The ATH particles of claim 4, wherein the ATH particles have an $r_{50}$ in the range from about 0.09 to about 0.185 μm.

* * * * *

UNITED STATES PATENT AND TRADEMARK OFFICE
CERTIFICATE OF CORRECTION

PATENT NO. : 8,642,001 B2  Page 1 of 1
APPLICATION NO. : 12/304507
DATED : February 4, 2014
INVENTOR(S) : Herbiet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this
Twenty-second Day of September, 2015

Michelle K. Lee
*Director of the United States Patent and Trademark Office*